Figure 1:
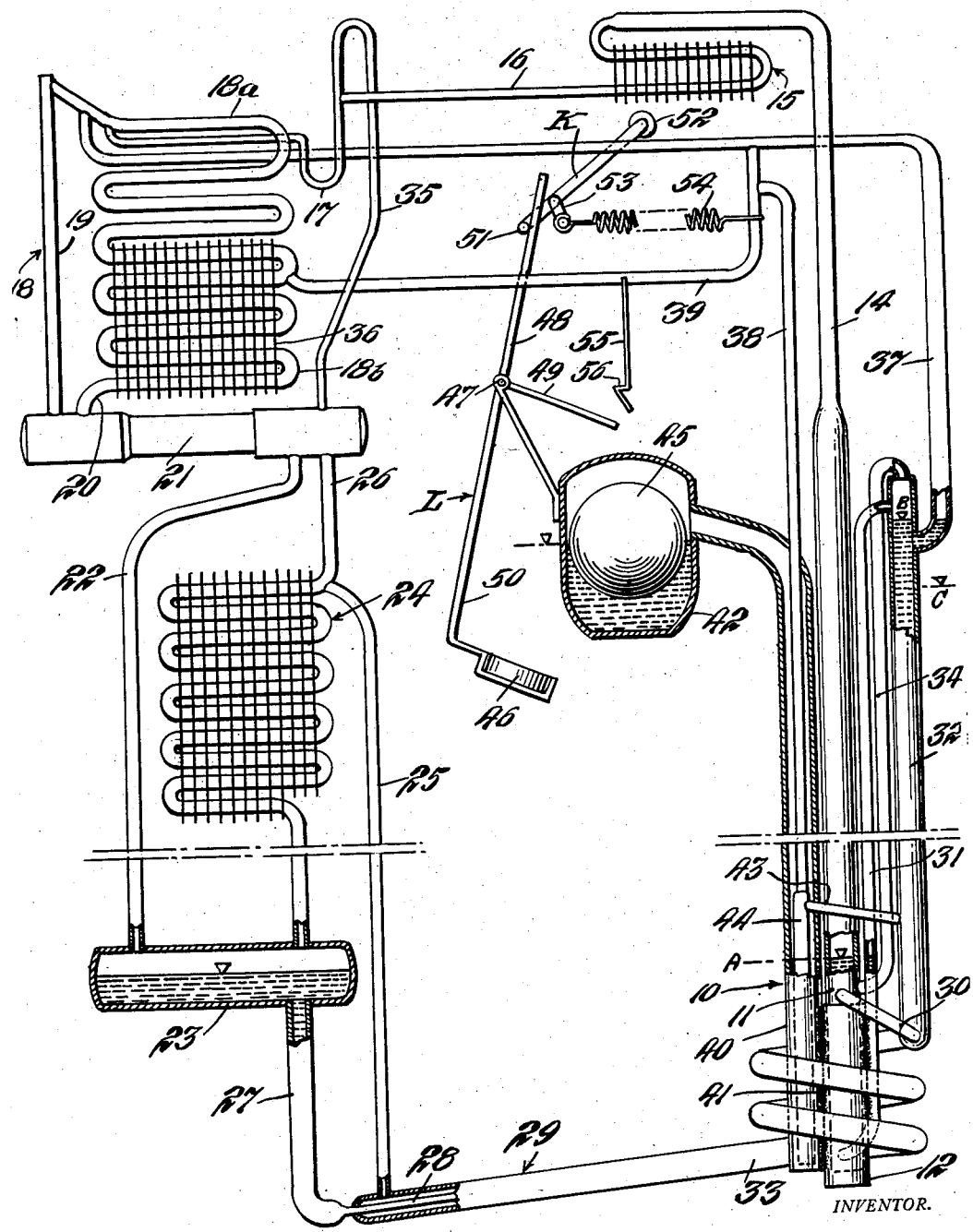

April 14, 1959     A. G. HELLSTRÖM     2,881,598
HEAT TRANSFER SYSTEM OF THE VAPORIZATION-CONDENSATION TYPE
Filed June 12, 1953     2 Sheets-Sheet 2
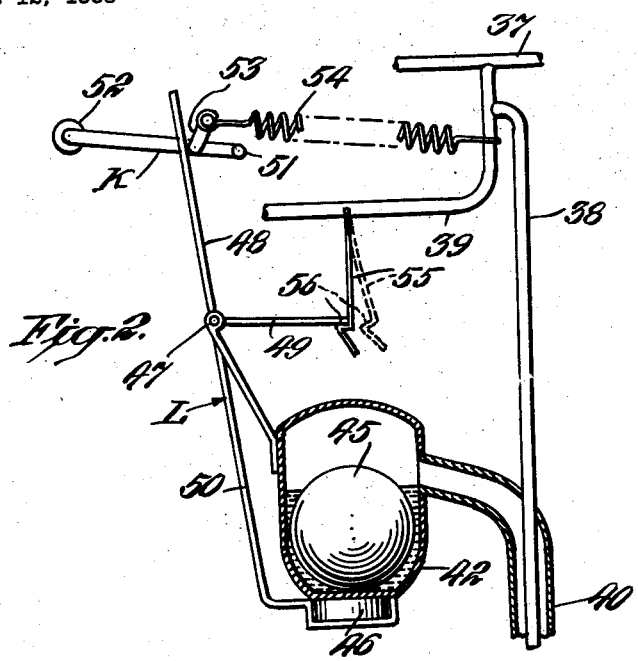
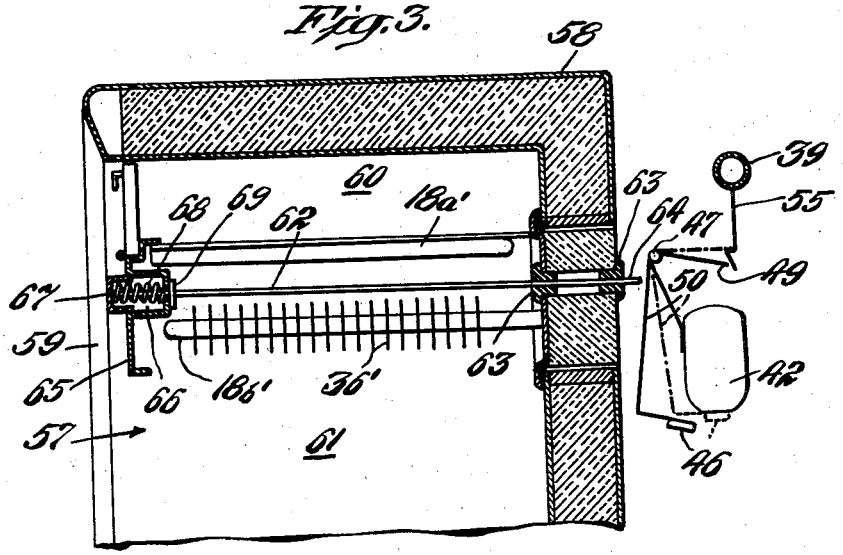
INVENTOR.
Axel Gösta Hellström
BY Edmund A. Fenander
his ATTORNEY

United States Patent Office 2,881,598
Patented Apr. 14, 1959

2,881,598

HEAT TRANSFER SYSTEM OF THE VAPORIZATION-CONDENSATION TYPE

Axel Gosta Hellström, Stockholm, Sweden, assignor to Aktiebolaget Elektrolux, Stockholm, Sweden, a corporation of Sweden Application June 12, 1953, Serial No. 361,393

Claims priority, application Sweden June 17, 1952

9 Claims. (Cl. 62—141)

My invention relates to heat transfer systems of the kind making use of vaporization and condensation of a volatile fluid.

Heat transfer systems of this type are especially useful in absorption refrigeration apparatus for transferring liquid absorbent to a part of the apparatus normally free of such absorbent for the purpose of modifying the normal operation of the apparatus. For example, the normal operation of the refrigeration apparatus may be modified by transferring warm liquid absorbent to an evaporator or cooling unit to effect defrosting thereof.

The heat transfer system, which is hermetically sealed and partly filled with volatile fluid, may include a lower vaporization portion arranged to be heated by a source of heat and an upper condensation portion within which the volatile fluid may be withheld from the vaporization portion or allowed to flow thereto when desired. When employed to transfer liquid absorbent from one level to a higher level in absorption refrigeration apparatus which is normally free of the absorbent, the volatile fluid may be allowed to flow to the vaporization portion when desired to initiate pumping of absorption solution from the absorption solution circuit to the higher level in the refrigeration apparatus.

It has already been proposed to provide a heat transfer system of the vaporization-condensation type in which the condensation portion is movable with respect to other parts of the system to facilitate removal of volatile fluid therefrom to the vaporization portion of the system. Such relative movement of the condensation portion with respect to other parts of the system has been effected to a flexible connection which enables the condensation portion to be shifted momentarily to remove volatile fluid therefrom and then moved back to its original position to collect and retain volatile fluid condensed therein. Such vaporization-condensation heat transfer systems are objectionable because some of the volatile fluid removed from the condensation portion is often "splashed back" and returned thereto without doing useful work due to violent boiling of some of the removed volatile fluid initially introduced into the vaporization portion.

It is an object of my invention to provide an improved vaporization-condensation heat transfer system of this type in which all of the volatile fluid removed from the condensation portion is effectively utilized to do useful work even when "splash-back" may occur.

Another object of the invention is to provide such an improved vaporization-condensation system which is characterized by the absence of any flexible connection and in which all parts are always in open fluid communication with one another. I accomplish this by providing a heat transfer system of the vaporization-condensation type having a trap or chamber in which a body of volatile fluid may be withheld from the vaporization portion and from which fluid can flow by gravity to the vaporization portion when displaced in the trap or chamber by a float which is magnetically attracted downwardly into the body of fluid.

The novel features which I believe to be characteristic of my invention are set forth with particularity in the claims. The invention, both as to organization and method, together with the above and other objects and advantages thereof, will be better understood by reference to the following description taken in connection with the accompanying drawings forming a part of this specification, and of which:

Fig. 1 more or less diagrammatically illustrates absorption refrigeration apparatus and a heat transfer system associated therewith embodying the invention;

Fig. 2 is a fragmentary view of part of the construction of Fig. 1 to illustrate details more clearly; and Fig. 3 is a fragmentary vertical sectional view of a refrigerator illustrating a modification of the invention.

In the drawing I have shown my invention in connection with an absorption refrigeration system of a uniform pressure type which is well known in the art and in which an inert pressure equalizing gas is employed. Such a refrigeration system comprises a generator or vapor expulsion unit 10 including a boiler or pipe 11 containing a refrigerant, such as ammonia, in solution in a body of absorption liquid, such as water. Heat is supplied to the boiler 11 from a heating tube 12 thermally connected therewith, as by welding, for example. The heating tube 12 may be heated in any suitable manner, as by an electrical heating element disposed within the tube 12.

The heat supplied to the boiler 11 and its contents expels refrigerant vapor out of solution and such vapor passes upwardly from the vapor expulsion unit 10 through a vertically extending conduit 14 into an air cooled condenser 15 in which it is condensed and liquefied. Liquid refrigerant flows from condenser 15 through conduits 16 and 17 into a cooling unit or evaporator 18 in which it evaporates and diffuses into an inert pressure equalizing gas, such as hydrogen, which enters through a conduit 19. Due to evaporation of refrigerant fluid into inert gas, a refrigerating effect is produced with consequent absorption of heat from the surroundings.

The rich gas mixture of refrigerant vapor and inert gas formed in cooling unit 18 flows from the lower part thereof through a conduit 20, one passage of a gas heat exchanger 21, conduit 22 and absorber vessel 23 into the lower end of an absorber coil 24. In absorber coil 24 the rich gas mixture flows countercurrent to downwardly flowing absorption liquid which enters through a conduit 25. The absorption liquid absorbs refrigerant vapor from inert gas, and inert gas weak in refrigerant flows from absorber coil 24 in a path of flow including conduit 26, another passage of gas heat exchanger 21 and conduit 19 into the upper part of the cooling element 18.

The circulation of gas in the gas circuit just described is due to the difference in specific weight of the columns of gas rich and weak, respectively, in refrigerant vapor. Since the column of gas rich in refrigerant vapor and flowing from cooling element 18 to the absorber coil 24 is heavier than the column of gas weak in refrigerant and flowing from the absorber coil 24 to cooling element 18, a force is produced or developed within the system for causing circulation of inert gas in the manner described.

Absorption solution enriched in refrigerant flows from the absorber vessel 23 through a conduit 27 and an inner passage or pipe 28 of a liquid heat exchanger 29 which is disposed about the lower part of the vapor expulsion unit 10. The liquid flows from the inner pipe 28 of the liquid heat exchanger and conduit 30 into the boiler 11 at a point which is at a level below the liquid level in the absorber vessel 23 and below the liquid level of the column of liquid contained in the boiler. From the lower closed end of the boiler 11 liquid passes into the lower end of a lift tube or pump pipe 31 in thermal exchange relation with the heating tube 12, as by welding, for example.

Liquid is raised by thermosiphon or vapor-liquid lift action through pipe 31 to the upper part of a standpipe or riser 32 which is connected at its lower end to the outer passage or pipe 33 of the liquid heat exchanger 29. The absorption liquid from which refrigerant vapor has been expelled flows from the standpipe 32 through the outer passage 33 of the liquid heat exchanger and conduit 25 into the upper part of absorber coil 24. The circulation of absorption solution in the liquid circuit just described is effected by raising of liquid through pipe 31.

The principal part of generated vapor produced in the vapor expulsion unit 10 is expelled from solution in boiler pipe 11, and liquid of decreasing refrigerant concentration flows downwardly in the boiler pipe to the bottom closed end thereof. The vapor passing from the upper end of vapor lift tube 31 into the vapor space of standpipe 32 flows therefrom through a conduit 34 into the boiler pipe 11 at a region which is below the surface level of the liquid column maintained in such pipe. The vapor flowing from the lower end of conduit 34 bubbles through enriched absorption solution and is analyzed, whereby absorption liquid vapor will be removed from refrigerant vapor. Refrigerant vapor expelled out of solution in boiler 11, together with refrigerant vapor entering the boiler through conduit 34 from the upper part of the standpipe 32, flows upwardly from the vapor expulsion unit 10 through conduit 14 to the condenser 15, as previously explained. The lower end of the condenser 15 is connected by conduit 35 to the gas circuit, as to the gas heat exchanger 21, for example, so that any non-condensable gas which may pass into the condenser can flow to the gas circuit and not be trapped in the condenser.

The cooling unit or evaporator 18 comprises two cooling sections 18a and 18b which are shown in the form of coils and adapted to be positioned in the thermally insulated interior of a refrigerator cabinet. The cooling section 18a may be suitably arranged in a storage space to provide one or more freezing compartments adapted to receive trays for freezing water and other matter to be frozen. The cooling section 18b is arranged with a plurality of cooling heat transfer fins 36 whereby a relatively extensive surface is provided for cooling air in a storage space.

The cooling sections 18a and 18b are connected in series relation with inert gas from conduit 19 flowing through cooling section 18a in the presence of and in parallel flow with liquid refrigerant which is introduced through conduit 17. From the lower part of cooling section 18a inert gas then flows downwardly through the lower cooling section 18b. Unevaporated liquid refrigerant from the lower part of cooling section 18a is introduced into cooling section 18b and flows downwardly therein in the presence of and in parallel flow with the inert gas.

Since the inert gas flows successivly through the cooling sections 18a and 18b, the gas in the upper cooling section 18a contains a lesser amount of refrigerant vapor than the gas in the lower cooling section 18b. The partial vapor pressure of the refrigerant is a gradient, so that the temperature of liquid refrigerant in the cooling sections is also a gradient, the evaporating temperature of liquid being lower in the upper cooling section 18a which constitutes the freezing portion of the cooling structure.

In order to increase the temperature of the low and higher temperature evaporator sections 18a and 18b when it is desired to melt frost which may accumulate thereon, provision is made, as will be described presently, for flowing hot vapor from the upper end of standpipe 32 through a conduit 37 to the low temperature evaporator section 18a and for raising warm absorption solution from the standpipe 32 through a riser 38 into a conduit or U-trap 39 from which absorption solution flows by gravity into the higher temperature evaporator section 18b. In this manner effective defrosting is obtained due to the relatively high temperature of the hot vapor formed in the vapor expulsion unit 10 and the relatively high temperature to which the solution is heated therein. The absorption solution passes from the higher temperature evaporator section 18b through the gas heat exchanger 21 to the absorber vessel 23.

The riser 38 constitutes a vapor lift tube or pump pipe through which absorption solution is raised when desired by heat derived from the heating tube 12 with the aid of a controllable heat transfer member. The heat transfer member comprises a secondary heat transfer system including a vertically extending conduit or section 40 having the lower portion thereof in thermal exchange relation with the heating tube 12 at 41, as by welding, and a vessel or liquid holding chamber 42 connected to the upper end of the vertical section 40.

The heat transfer system is hermetically sealed and is charged with a volatile fluid substantially all of which is held in the vessel 42 when the system is ineffective to transfer heat, as shown in Fig. 1. When it is desired to effect defrosting of the cooling sections 18a and 18b, fluid held in vessel 42 is removed therefrom in a manner which will be explained presently, such removed fluid flowing by gravity from the vessel to the lower portion of the vertical section 40. The lower portion of the vertical section 40 constitutes the vaporization portion of the heat transfer system in which the fluid is vaporized by heat taken up from the heating tube 12. The vapor formed in the bottom of the vertical section 40 is partly condensed in such vertical section and gives up heat to the riser 38 and its contents to raise absorption solution by thermosiphon or vapor lift action from standpipe 32 to the higher temperature cooling section 18b. Such lifting of absorption solution continues until all of the vapor is condensed in the vessel 42 which constitutes the condenser portion of the heat transfer system. In this way substantially all of the volatile fluid is held back from the lower vaporization portion of the vertical section 40, and heat transfer to the riser 38 at a sufficient rate to cause raising of solution therein is terminated.

The lower end of the riser 38 is connected by a conduit 43 to the standpipe 32, and the riser 38 in effect is extended downwardly from the region conduit 43 communicates with the standpipe 32 by a pipe section 44 which is closed at its lower end and forms a dead-end liquid pocket. The pipe section 44 is disposed within the lower portion of the vertical section 40 of the heat transfer system which can be rendered operable, when desired, for effectively utilizing the heating flue 12 to supply heat to the lower extended portion or pipe section 44 of the riser or lift tube 38.

During normal operation of the refrigeration system when a source of heat is applied to the heating tube 12 and evaporator 18 is producing a refrigerating effect, the pipe section 44 contains absorption solution which is relatively weak in refrigerant and flows therein through the conduit 43 from the standpipe 32. Since the lower portion of the vertical section 40 of the heat transfer system is heat conductively connected at 41 to the heating tube 12, the lower end of the vertical section 40 becomes heated and heat is radiated from the inner wall surface thereof to the pipe section 44. Such heating of the pipe section 44 by radiated heat is insufficient to render the riser or lift tube 38 operable to raise solution by vapor lift action. However, the radiated heat is taken up by the pipe section 44 and the concentration of refrigerant in the absorption solution gradually becomes reduced due to such heating. When the same body of absorption solution in the pipe section or pocket 44 is held therein for a sufficiently long interval of time and not displaced or replenished by other absorption solution during periods when the riser or pump pipe 38 is ineffective to raise solution therethrough, the liquid in the pipe section 44 may eventually have such a low concentration of refrigerant that it consists substantially entirely of absorption liquid.

When it is desired to raise warm absorption solution from the standpipe 32 into the higher temperature cooling section 18b, volatile fluid is caused to flow from vessel 42 to the bottom of the vertical section 40 of the heat transfer system. The volatile fluid is vaporized by heat supplied by the heating tube 12, and heating of the liquid in the pocket 44 will take place at a sufficiently rapid rate to bring such liquid to its boiling temperature even when the liquid is substantially entirely absorption liquid alone. At the same time heat is supplied at a sufficiently rapid rate to the riser or lift tube 38 and solution therein to cause expulsion of vapor and effect raising of warm absorption solution therein by thermosiphon or vapor lift action into conduit 39 from which the raised solution flows by gravity into the higher temperature cooling section 18b to effect rapid defrosting.

During normal operation of the refrigeration system of Fig. 1, the liquid level A in the boiler 11 is essentially the same as the liquid level in the absorber vessel 23. The vapor lift tube 31 raises absorption solution from the level A to the higher level B in standpipe 32, the liquid level in the standpipe being somewhat higher than the region at which solution overflows from the upper end of conduit 25 into the upper end of absorber coil 24 in order to provide a static pressure head which will overcome resistance to gravity flow of solution in its path of flow from the standpipe to the upper end of the absorber coil.

When the riser or pump pipe 38 is rendered operable to raise warm absorption solution from standpipe 32 to the higher temperature cooling section 18b, the liquid level in the standpipe falls from the level B to a lower level C. This is so because, when the riser 38 becomes effective to pump absorption solution, such solution will be raised at faster rate through the riser 38 than that at which absorption solution is raised through the vapor lift tube 31, the reaction head for the riser 38 being greater than the reaction head for the vapor lift tube 31. With such fall of the absorption solution in standpipe 32 to the level C, which is below the upper connection of conduit 25 to the absorber coil 24, flow of absorption solution into the absorber coil will stop and refrigerant vapor will no longer be absorbed from inert gas. Accordingly, the difference in specific weight of the columns of gas rich and weak, respectively, in refrigerant vapor will also decrease and eventually the circulation of inert gas will stop.

When the circulation of inert gas stops, liquid refrigerant introduced into the evaporator 18 will no longer be capable of evaporating and diffusing into inert gas to produce a low temperature refrigerating effect. This aids and assists the warm absorption solution flowing into the higher temperature cooling section 18b to hasten and speed up defrosting of the latter. Further, when the liquid level in the standpipe 32 falls from the level B to the lower level C, the liquid normally held in the lower end of the conduit 37 flows downwardly into the standpipe, thus opening the liquid trap formed at the region the lower end of the conduit 37 is connected to the standpipe. Since heating of the boiler 11 is still being continued and vapor lift tube 31 is functioning to raise liquid therein, the hot lifting vapor will now flow through the conduit 37 to the low temperature evaporator section 18a because the resistance to flow of such vapor is less in the conduit 37 than that offered to flow of vapor through conduit 34 which is connected to boiler pipe 11 below the liquid surface level therein. The hot vapor flowing through the conduit 37 to the low temperature cooling section 18a, together with the vapor passing from the upper end of the riser 38 into the upper portion of the conduit 37, effects defrosting of this cooling section, such defrosting also being aided by the fact that normal circulation of inert gas through the cooling unit 18 has stopped and the production of refrigerating or cooling effect has been suspended.

In accordance with my invention, in order to insure efficient operation of the secondary heat transfer system under all operating conditions encountered, the vessel 42 constitutes a float chamber having a suitable float 45 therein which is attracted downwardly by a magnet 46 to cause volatile fluid held in the chamber to be displaced therefrom and flow downwardly by gravity into the vertical section 40, the lower portion of which forms the vaporization portion of the heat transfer system.

The float 45, which is in the form of a hollow sphere or ball in the preferred embodiment illustrated, is formed of suitable magnetic material while the vessel 42 is formed of a non-magnetic material. By way of example and for the purpose of illustration only, I have employed a ball float formed of sheet steel, such as iron containing about 0.5% carbon, for example, which is arranged in a vessel formed of non-magnetic material, such as brass, for example. The magnet 46 desirably is a permanent magnet like that sold under the trade name "Alnico," the bottom of the vessel 42 having a flattened portion toward which the magnet may be moved when desired.

Suitable mechanism is provided for moving the magnet 46 to an operative position against the bottom of the vessel 42, such mechanism including provisions for automatically moving the magnet to an inoperative position which is removed from the vessel responsive to an operating condition which occurs when defrosting of the cooling unit or evaporator 18 has been initiated. The mechanism for operating magnet 46 may comprise a lever L suitably pivoted at 47, such lever including an upwardly extending arm 48, a horizontally extending arm 49 and a downwardly extending arm 50 formed to receive and hold the permanent magnet 46 at its lower end.

The arm 48 of lever L is arranged to be actuated by a crank K which is pivoted at 51 and formed with a suitable handle 52, such crank having an L-shaped arm 53 adapted to contact arm 48 and impart movement thereto. A coil spring 54, having one end thereof connected to a suitable support and the opposite end thereof connected to the L-shaped arm 53, is arranged to move the crank K to the solid line position shown in Fig. 1 when the handle 52 is released.

A member 55 movable responsive to change in temperature of conduit 39 is arranged to hold arm 49 under certain conditions and to release the arm 49 upon increase in temperature of the conduit 39 when warm absorption solution overflows therein from the upper end of the riser or pump pipe 38. In the preferred embodiment being described, the member 55 may comprise a bi-metallic strip fixed to the conduit 39. The lower end of the member or bi-metallic strip 55 is formed with a catch 56 which is adapted to hold the arm 49 in an elevated position when the latter is moved from the position shown in Fig. 1 to the position shown in Fig. 2 and the member 55 remains essentially straight and is not flexed.

When it is desired to raise warm absorption solution from the standpipe 32 into the cooling section 18b and also cause hot vapor to flow from the upper ends of the standpipe 32 and riser 38 into the cooling section 18a, the crank K is turned one revolution either in a clockwise or anti-clockwise direction about the pivot 51 with the aid of handle 52. Irrespective of the direction in which the crank K is turned, the L-shaped arm 53 contacts arm 48 and imparts movement thereto, thereby moving lever L from the position shown in Fig. 1 to the position shown in Fig. 2. In Fig. 2 it will be seen that arm 49 is held in its raised position by the catch 56 of the member 55, thus holding the permanent magnet 46 against the bottom of vessel 42. When the lever L has been moved to the position shown in Fig. 2 and the crank K has been turned one revolution in either direction, as just explained, the handle 52 of the crank is released, the coil spring 54 becoming effective to return and retract the crank to its starting position, as shown in Fig. 1.

By moving the permanent magnet 46 against the bottom of the vessel 42, the ball float 45 is magnetically attracted downwardly, thereby moving the float downwardly against a buoyant force exerted on the float by the liquid to displace volatile liquid from the float chamber and overflow therefrom by gravity to the bottom of the vertical section 40 of the heat transfer system. When this occurs lifting of warm absorption solution is effected in the riser or pump pipe 38 due to vaporization of the volatile fluid in the vertical section 40 by heat supplied by the heating tube 12, as explained above. The warm absorption solution raised in the riser 38 flows through the conduit or U-trap 39 into the cooling section 18b. Such warm absorption solution in conduit 39 causes heating and flexing of the bi-metallic strip 55 from the solid line position to the dotted line position in Fig. 2, thereby rendering catch 56 ineffective to hold up arm 49 and allowing the lever L to move from the position shown in Fig. 2.

When the thermostatic member 55 responds to increase in temperature in conduit 39 due to flow of warm absorption solution therethrough, the lever L moves clockwise by its own weight and moves the magnet 46 from its operative position in Fig. 2 to its inoperative position in Fig. 1. The ball float 45 now floats freely at the top of the body of volatile fluid held in the float chamber or vessel 42. Under these conditions lifting of absorption solution in the riser 38 continues until all of the vapor is condensed in the vessel 42.

With all of the volatile fluid of the secondary heat transfer system retained in the float chamber or vessel 42, lifting of warm absorption solution in the riser 38 terminates. Since heating of the vapor expulsion unit 10 by the heating tube 12 has continued uninterruptedly during defrosting of the evaporator 18, such heating by the heating tube 12 will bring about normal operation of the refrigeration system very rapidly. The liquid level in the standpipe 32 will immediately rise from the level C to the level B to stop flow of hot vapor to the evaporator section 18a through conduit 37. Such rise in liquid level in the standpipe 32 will bring about normal circulation of absorption solution in its circuit; and, with refrigerant vapor again being absorbed from inert gas in the absorber coil 24, normal circulation of inert gas in its circuit will again be effected and a refrigerating effect will be produced in the cooling unit or evaporator 18.

In secondary heat transfer systems of the kind under consideration here, violent boiling of volatile fluid initially flowing to the vaporization portion often occurs when the volatile fluid is removed from the condensation portion. Such violent boiling of a part of the volatile fluid often causes some of the volatile fluid to be "splashed back" and returned to the condensation portion, the vapor resulting from the violent boiling of the fluid developing sufficient force to cause return of the fluid to the condensation portion without being utilized in the vaporization portion to effect lifting or pumping of warm absorption solution to a higher level. The improved secondary heat transfer system I have provided possesses the advantage that the permanent magnet 46 can be moved to its operative position and held in such position for an interval of time sufficiently long to make certain all of the volatile fluid, including any fluid which may be "splashed back" due to violent boiling which may occur when fluid initially reaching the vaporization portion, is ultimately removed from the condensation portion to the vaporization portion of the secondary heat transfer system.

In the preferred embodiment which I have shown and described, the magnetic field produced by the permanent magnet 46 acts on the ball float 45 in such manner that the latter remains in its depressed position until the bi-metallic strip 55 releases arm 49 of lever L responsive to increase in temperature resulting from flow of warm absorption solution in conduit 39. In this way essentially the same quantity of volatile fluid will be displaced from the float chamber 42 into the vertical section 40 each time defrosting of the cooling unit or evaporator 18 is desired. In the event any volatile fluid should be "splashed back" due to violent boiling of fluid in the lower part of the vertical section 40, the ball float 45 will continue to remain in its depressed position in the float chamber 42 and cause such "splashed-back" fluid to be displaced from the float chamber into the vertical section 40. Hence, the same quantity of volatile fluid will be available in the vertical section 40 each time the defrosting operation is instigated and the defrosting periods will be essentially of the same duration under all operating conditions encountered. Accordingly, the quantity of volatile fluid displaced from the float chamber 42 each time a defrosting operation is initiated can be nicely controlled and defrosting of the cooling unit or evaporator 18 can be effected quickly and rapidly without the likelihood of thawing or otherwise damaging frozen food packages and the like normally kept below the freezing temperature by the low temperature cooling section 18a.

In a control mechanism for a secondary heat transfer system which has been constructed and satisfactorily operated and like that shown and described above, the crank K and operating handle 52 therefor are accessible at the front of the cooling unit or evaporator 18. However, it should be understood that in practice the operating mechanism for initially moving the permanent magnet 46 to its operating position may take a variety of different forms. Such a modified arrangement is shown in Fig. 3 in which the low and higher temperature cooling sections 18a' and 18b' are disposed within the thermally insulated interior 57 of a refrigerator cabinet 58 having a front access opening 59 adapted to be closed by a closure member (not shown) hinged to the front of the cabinet. The looped coils forming the cooling sections 18a' and 18b' are horizontally disposed, the low temperature cooling section 18a' being arranged to effect cooling of a freezing compartment 60 and the higher temperature cooling section 18b' having cooling fins 36' to promote cooling of a higher temperature compartment 61.

In the embodiment of Fig. 3 parts of the secondary heat transfer system are diagrammatically illustrated at the rear of the cabinet 58, parts similar to those shown in Fig. 1 being referred to by the same reference numerals. In Fig. 3 a push rod 62 extends rearwardly from the vicinity of the access opening 59 through a pair of apertured bushings 63 which are disposed in the rear wall of the cabinet and formed of a suitable insulating material like rubber, for example. The rear end 64 of the push rod 62 is arranged to act against the downwardly extending arm 50 of the lever L.

The forward end of the push rod 62 passes through an opening in a front baffle plate 65 which serves to conceal the cooling section 18b' from view, the baffle plate being formed to provide a cup-shaped recess or cavity 66 arranged to receive a cap or flanged button 67 which is movable in the cavity and to which the extreme forward end of the push rod 62 is fixed. A coil spring 68 is arranged in the cavity 66 about the push rod 62, the spring acting against the cap or button 67 and being effective to urge the push rod in a forward direction. A washer 69 is secured to the push rod 62, at the rear of the baffle plate 65, to limit the extent of forward movement of the rod by the spring 68 when the cap or button 67 is released.

The embodiment of Fig. 3 differs from the first described embodiment in that the upper arm 48 is eliminated. This is so because the rear end 64 of the push rod 62 is arranged to act directly against the lower vertically extending arm 50 of the lever L. Further, in the modification of Fig. 3 the lever L and bi-metallic strip 55 are shown at a right angle or 90° with respect to the position these parts assume in the embodiment first described and illustrated in Figs. 1 and 2. In other respects, the mechanism in Fig. 3 for moving the permanent magnet 46 to its operating position against the bottom of the vessel 42 is the same as in the embodiment of Figs. 1 and 2 and the detailed description of operation given above for the first described embodiment also is applicable to the modification of Fig. 3 and will not be repeated here.

Modifications of the embodiments of my invention which I have described will occur to those skilled in the art, so that I desire my invention not to be limited to the particular arrangements set forth. Thus, the bi-metallic strip or thermostatic member responsible for movement of the permanent magnet from its operative position may be arranged in heat conductive relation with the riser or pump pipe through which warm absorption liquid is raised to a higher level from the vapor expulsion unit. Therefore, I intend in the claims to cover all those modifications which do not depart from the spirit and scope of my invention.

What is claimed is:

1. A heat transfer system including a vaporization portion and a condenser portion, conduit means connecting said portions to form a circuit for circulation of a volatile fluid, said conduit means providing an unobstructed communication between said vaporization and condenser portions which enables these parts to operate at substantially the same pressure, said circuit comprising means including a trap which, when said vaporization portion is depleted of the fluid in liquid phase, collects all of the condensate formed in said condenser portion and from which trap condensate is adapted to flow to said vaporization portion, a member in said trap adapted to float in the body of condensate collected therein, said member being formed of metal influenced by a magnetic field, and means providing a magnetic field for moving said member into the body of condensate in said trap to displace condensate therefrom for flow to said vaporization portion.

2. A heat transfer system as set forth in claim 1 in which said conduit means provides a common path of flow for vapor flowing from said vaporization portion to said condenser portion and for condensate flowing from said trap to said vaporization portion.

3. A heat transfer system including a vaporization portion and a condenser portion, conduit means connecting said portions to form a hermetically closed circuit partly filled with a volatile fluid, said conduit means providing an unobstructed communication between said vaporization and condenser portions which enables these parts to operate at substantially the same pressure, said circuit comprising means including a trap which, when said vaporization portion is depleted of the fluid in liquid phase, collects all of the condensate formed in said condenser portion, said trap having an opening above the normal surface level of such condensate collected therein and through which condensate is adapted to overflow to said vaporization portion, a member formed of ferromagnetic material in said trap adapted to float on the condensate collected therein, and means providing a magnetic field for moving said member into the condensate collected in said trap to raise the surface level thereof and displace condensate through the opening for flow to said vaporization portion.

4. A heat transfer system as set forth in claim 3 in which said member is hollow and of such size that it cannot pass through the opening in said trap.

5. A heat transfer system including a vaporization portion and a condenser portion, conduit means connecting said portions to form a hermetically closed circuit partly filled with a volatile fluid, said conduit means providing an unobstructed communication between said vaporization and condenser portions which enables these parts to operate at substantially the same pressure, said circuit including means providing a chamber which, when said vaporization portion is depleted of the fluid in liquid phase, accumulates all of the condensate formed in said condenser portion, a ferromagnetic float in said chamber, magnetic means for immersing said float in the condensate accumulated in said chamber to displace condensate therefrom for flow to said vaporization portion, and means responsive to an operating condition influenced by transfer of heat for controlling said magnetic means.

6. A heat transfer system including a vaporization portion and a condenser portion, conduit means connecting said portions to form a hermetically closed circuit partly filled with a volatile fluid, said conduit means providing an unobstructed communication between said vaporization and condenser portions which enables these parts to operate substantially at the same pressure, said circuit including means providing a chamber which, when said vaporization portion is depleted of fluid in liquid phase, accumulates all of the condensate formed in said condenser portion, a ferromagnetic float in said chamber, a magnet, means for moving said magnet toward and from said chamber, said magnet when moved toward said chamber being operable to cause said float to immerse in the condensate accumulated in said chamber to displace condensate therefrom for flow to said vaporization portion.

7. A heat transfer system as set forth in claim 6 in which said means for moving said magnet toward and from said chamber includes a part movable to a first position when said magnet is rendered operable to cause said float to immerse in the condensate accumulated in said chamber to displace condensate therefrom, and means for holding said part in said first position, said last-mentioned means being ineffective to hold said part in said first position responsive to change in temperature.

8. Absorption refrigeration apparatus comprising an absorption liquid circuit, a vapor-liquid lift pump for raising absorption liquid from said circuit to a level in the apparatus normally free of such lquid, a heat transfer system including a vaporization portion and a condenser portion, conduit means connecting said portions to form a hermetically closed circuit partly filled with a volatile fluid, said pump having a part in thermal relation with said volatile fluid circuit and operable to raise absorption liquid by heat derived from vapor formed in said vaporization portion, said volatile fluid circuit including a chamber for accumulating therein a body of condensate formed in said condenser portion, a ferro-magnetic float in said chamber, magnetic means for immersing said float in the body of condensate to displace condensate from said chamber for flow to said vaporization portion, and means responsive to an operating condition affected by raising of absorption liquid in said pump for controlling said magnetic means.

9. Absorption refrigeration apparatus comprising an absorption liquid circuit, a vapor-liquid lift pump for raising absorption liquid from said circuit to a level in the apparatus normally free of such liquid, a heat transfer system including a vaporization portion and a condenser portion, conduit means connecting said portions to form a hermetically closed circuit partly filled with a volatile fluid, said pump having a part in thermal relation with said volatile fluid circuit and operable to raise absorption liquid by heat derived from vapor formed in said vaporization portion, said volatile fluid circuit including a chamber for accumulating therein a body of condensate formed in said condenser portion, a ferro-magnetic float in said chamber, and magnetic means for immersing said float in the body of condensate to displace condensate from said chamber for flow to said vaporization portion.

References Cited in the file of this patent

UNITED STATES PATENTS

| | | |
|---|---|---|
| 1,860,106 | Le Van | May 24, 1932 |
| 1,972,420 | Hahnel | Sept. 4, 1934 |
| 2,133,952 | Buchanan | Oct. 25, 1938 |
| 2,164,730 | Backstrom | July 4, 1939 |
| 2,181,276 | Kogel | Nov. 28, 1939 |
| 2,293,922 | Sernis | Aug. 25, 1942 |
| 2,402,417 | Kogel | June 18, 1946 |
| 2,426,578 | Tobey | Aug. 26, 1947 |
| 2,580,443 | Kogel | Jan. 1, 1952 |

FOREIGN PATENTS

| | | |
|---|---|---|
| 379,391 | Great Britain | Sept. 1, 1932 |